Figure 1:
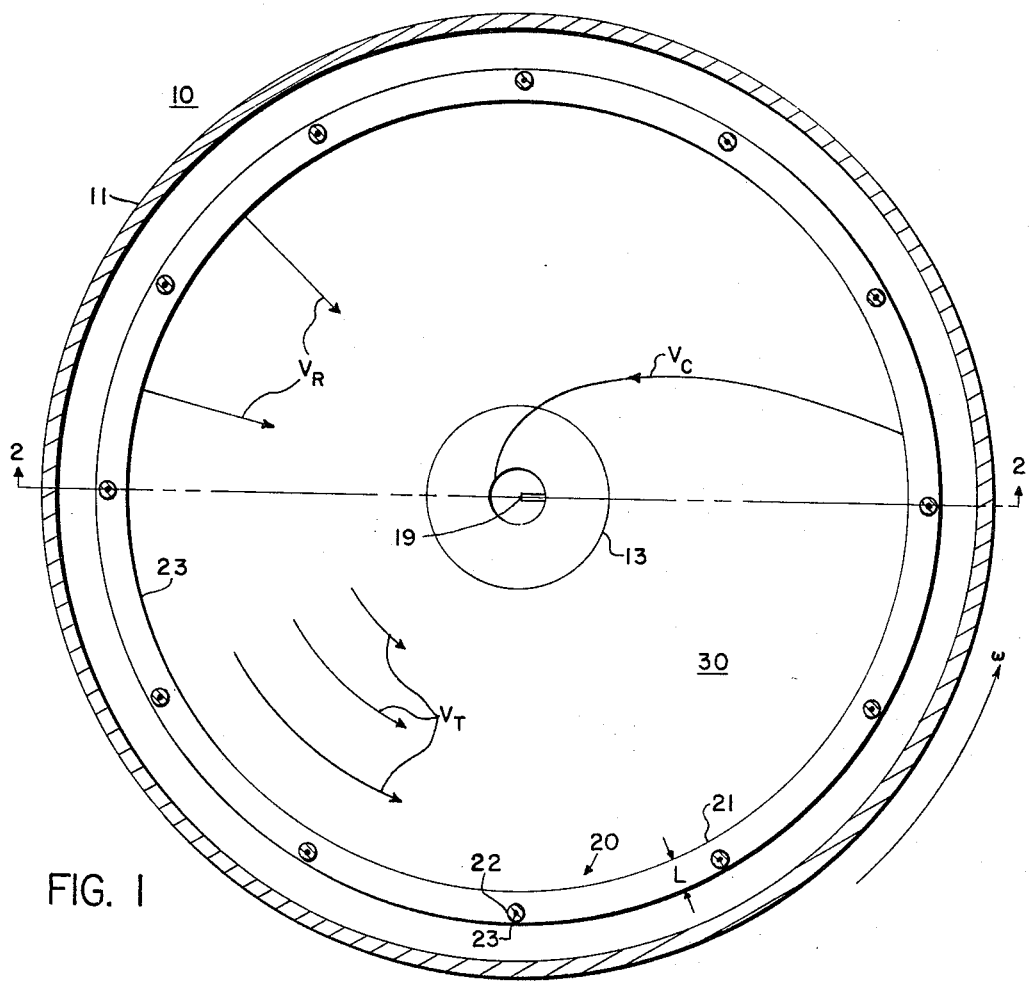

Nov. 15, 1966 W. H. EGLI 3,285,073
COUPLING MEANS FOR VORTEX APPARATUS
Filed April 15, 1964

INVENTOR.
WERNER H. EGLI
BY Charles J. Ungemach
ATTORNEY

United States Patent Office 3,285,073
Patented Nov. 15, 1966

3,285,073
COUPLING MEANS FOR VORTEX APPARATUS
Werner H. Egli, Minneapolis, Minn., assignor to
Honeywell Inc., a corporation of Delaware
Filed Apr. 15, 1964, Ser. No. 359,890
4 Claims. (Cl. 73—505)

This invention pertains to vertex rate sensing instruments and more particularly to coupling means for vortex rate sensing instruments.

A vortex rate sensor is a device utilized to sense the rate of turn (angular velocity) about an axis of a body upon which it is mounted. The measurement of angular velocity (rate) is utilized in many control systems such as automatic flight control systems (autopilots) and direction seeking instruments.

Structurally, the vortex rate sensor generally comprises a means defining a cylindrical chamber including coupling means positioned around the periphery of said chamber. An exhaust passage is centrally positioned within the chamber. The sensor is adapted to be connected to a fluid source whereby a fluid flows from said fluid source through the coupling means, through the chamber, and exhausts through the exhaust passage.

In the absence of any rate input, the fluid flow through the chamber approximates the classical two dimensional pure sink flow. The fluid flow in such a pure sink flow has only radial velocity. When the sensor is subjected to a rate (angular velocity) input about an input axis, the coupling ring functions to couple this rate (angular velocity) to the fluid flowing through the coupling element. This, a tangential or rotational velocity is superimposed upon the radial velocity. The term radial velocity is defined for purposes of this specification as meaning a velocity directed toward a center axis and is not limited to a direction perpendicular to the axis. The superimposition of the tangential velocity upon the radial velocity results in a fluid flow field in which the fluid streamline pattern is a spiral. Sensing the effect of the input rate upon the fluid flow field provides a measurement of the input rate to the rate sensor.

Due to the principle of conservation of angular momentum, the tangential or rotational velocity of the fluid will increase as the flow approaches the central outlet passage. Consequently, the vortex rate sensor possesses the unique and desirable characteristic of amplification of the parameter to be sensed (angular velocity) within the sensing device itself. Various amplificational levels may be obtained by varying the geometry of the vortex rate sensor.

Prior art vortex rate sensors utilize coupling elements which provide a very large number of individual passages randomly distributed around the periphery of the vortex chamber of the rate sensor. Structurally, this is obtained by utilizing a sintered metal coupling ring. Consequently, any bias contained within the coupling means is theoretically averaged out because of the very large number of small passages.

However, it has been determined that the principle of statistically averaging a large number of small random biases breaks down in the smaller diameter rate sensors. This results in a null shift or a null instability in the prior art vortex rate sensors. In addition, the prior art type coupling ring has contributed to the noise within a vortex rate sensor. The sintered metal coupling elements provide individual fluid passages wherein the fluid velocity may be as great as two-hundred times the average velocity of the fluid through the chamber thereby generating noise in the fluid flow. Furthermore, because of the high resistance to fluid flow of the prior art type of coupling rings, the smaller sized prior art vortex rate sensors have a relatively high power requirement.

The applicant has solved these problems by providing a unique coupling element for a vortex rate sensor. In one particular embodiment, the applicant's unique coupling means comprises a plurality of angular discs positioned substantially coaxial with the input axis of the rate sensor and equally spaced apart. The coupling action is provided by viscous drag between the surfaces of the discs. Tangential shearing is exerted on the fluid as it flows through the coupling element until the fluid has the same tangential velocity as the coupling element. The coupling efficiency of the applicant's coupling element is substantially equal to the coupling efficiency of the prior art devices. However, the type of unique coupling means provides a substantially greater null stability than previously obtainable. In addition, the output signal of the rate sensor contains less noise and the sensor has a lower power requirement.

Figure 2:
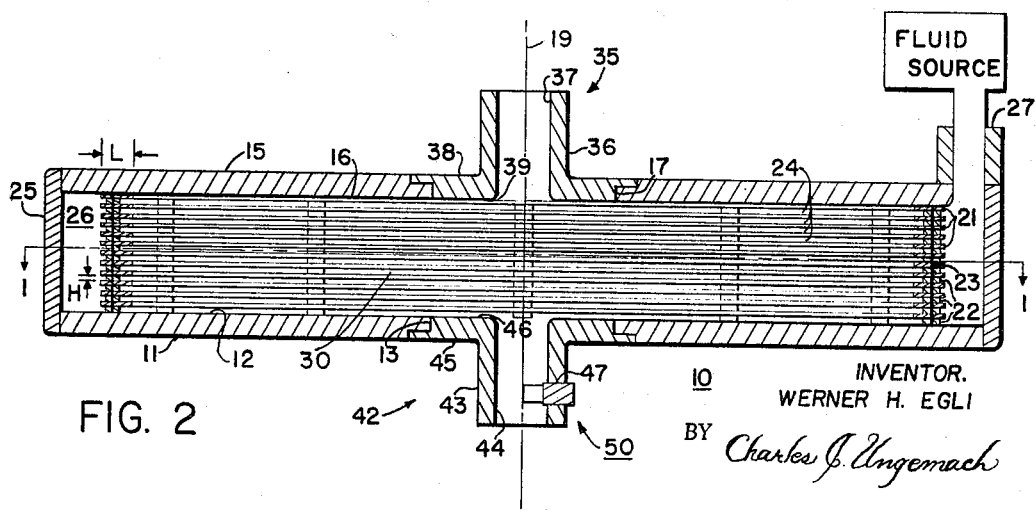

The scope of the applicant's invention will become apparent from a study of the specification and claims in conjunction with the drawings in which:

FIGURE 1 is a cross sectional view of a vortex rate sensor taken along lines 1—1 of FIGURE 2; and FIGURE 2 is a cross sectional view taken along lines 2—2 of FIGURE 1.

Referring now to FIGURES 1 and 2, reference numeral 10 generally depicts a vortex rate sensor. A cylindrical element 11 is provided having a plane surface 12 thereon. Element 11 has central aperture 13 therethrough having a circular cross section. A second cylindrical element 15 is provided having a plane surface 16 thereon. Element 15 has a central aperture 17 therethrough having a circular cross section. It is not necessary that surfaces 12 and 16 be planar for satisfactory operation of the rate sensor and the applicant does not wish to be limited to the structure illustrated.

Reference numeral 20 depicts the applicant's unique coupling means. Coupling means 20 comprises a plurality of annular discs 21 which are stacked one upon the other and approximately equally spaced apart by spacer means 22. Annular discs 21 are substantially coaxial with an axis 19. The elements 22 are equally angularly spaced in FIGURE 1, and are held in position by means of fasteners 23. Thus, coupling means 20 provides a plurality of narrow, elongated apertures 24 having a height H and an axial length L, through which a fluid may flow with the amount of restriction needed to couple the device turning rate into the fluid. The coupling efficiency of the coupling means is a function of the height and length of the apertures and the Reynolds Number $R_e$ of the fluid. The exact relationship is quite complex; however, the values of L, H, and $R_e$ for the embodiment illustrated are: L=.187 inch; H=.005 inch; $R_e$=3.5. The element had a 2.5 inch diameter.

In this particular embodiment there are limits on the thickness of the annular discs 21. A disc which is too thin will warp and consequently, will not retain the flat surface which is necessary. An annular disc which is too thick will decrease the viscous coupling and result in output noise and null shift. For the particular configuration illustrated, annular discs 21 are .005 inch thick.

Coupling means 20 is positioned between elements 11 and 15 so as to maintain plane surfaces 12 and 16 in a spaced parallel relationship. Axis 19 of coupling means 20 is substantially perpendicular to plane surfaces 12 and 16. Elements 11 and 15 in conjunction with coupling means 20 collectively define a cylindrical vortex chamber 30. The outer periphery of chamber 30 is defined by coupling means 20. The ends of chamber 30 are defined by plane surface 12 of element 11 and plane surface 16 of element 15.

A generally cylindrically shaped element 25 is positioned around the outer periphery of elements 11 and 15 in closing the space therebetween. Element 25 is rigidly attached to elements 11 and 15 by suitable means not shown, such as screws and adhesives. Element 25 is spaced apart from coupling means 20 and in conjunction therewith defines a manifold 26 between elements 11 and 15. Fluid is supplied to manifold 26 through a connector 27 which is connected to a fluid source.

A first exit member 35 is provided. Exit member 35 comprises a fluid conduit 36 having a passage 37 therethrough. Conduit 36 has an external flange portion on one end thereof. Flange portion 38 is positioned within aperture 17 of element 15 so that passage 37 of exit member 35 is positioned substantially coaxial with axis 19. An end surface 39 of exit member 35 is positioned so as to lie in the same plane as plane surface 16 of element 15. Exit member 35 is rigidly attached to element 15 by suitable means (not shown) such as adhesives or screws.

A second exit member 42 is also provided. Exit member 42 comprises a fluid conduit 43 having a passage 44 therethrough. Conduit 43 has an external flange portion 45 on one end thereof. Flange portion 45 is positioned within aperture 13 of element 11, so that passage 44 is positioned substantially coaxial with axis 19. An end surface 46 of exit member 42 is positioned so as to lie in the same plane as plane surface 12 of element 11. Exit member 42 is rigidly attached to element 11 by means (not shown) such as adhesives and screws. Although two outlet passages are illustrated, it should be pointed out that only one outlet passage, such as passage 44 is necessary for the operation of vortex rate sensor 10.

A readout means 50 is provided within a bore 47 in exit member 42. Readout means 50 functions to sense the effect of the rate input upon the fluid flow through vortex rate sensor 10. The details of one type of pickoff or readout means 50 are described in copending application Serial No. 157,142, filed in the name of Rudolf Herman and assigned to the same assignee as the present application. Other types of pickoff means may also be utilized in the vortex rate sensor.

In operation, a fluid flows into manifold 26 from the fluid source. A pressure differential exists between manifold 26 and passages 37 and 44 of exit members 35 and 42. Consequently, a fluid flows from manifold 26 through coupling means 20, through chamber 30, and exhausts through passages 37 and 44. In the absence of any rate input (angular velocity about axis 19) the fluid flow field comprises only radial velocity as approximately illustrated by radial velocity vectors $V_R$ in FIGURE 1. When the vortex rate sensor is subjected to an input rate, ω, as indicated by the arrow in FIGURE 1, coupling means 20 is also subjected to this rate. The fluid within coupling means 20 is given a tangential or rotational component of velocity because of viscous drag effect as the fluid passes through the narrow apertures in coupling means 20. The rotational or tangential component velocity of the fluid is illustrated by vectors $V_t$ in FIGURE 1. The superimposition of the tangential velocity upon the radial velocity results in a fluid flow field in which the fluid streamline pattern is a spiral $V_c$. The fluid flowing through chamber 30 in the spiral pattern exhausts through passages 37 and 44. This results in a fluid flow pattern in passages 37 and 44 in the form of a helix; that is to say, there is a component of fluid flow having a longitudinal velocity parallel to axis 24 and a component of fluid flow having a rotational velocity perpendicular to axis 24.

The tangential rotational velocity $V_t$ imparted to the fluid by coupling means 20 when sensor 10 is subjected to a rate input appears in passage 44 as component of fluid flow having a velocity perpendicular to axis 24. The magnitude of the tangential or rotational velocity is amplified within the vortex rate sensor and is indicative of the rate input. Readout means 50 provides an output signal indicative of the rate input.

Thus, the applicant has provided a unique coupling means for a vortex rate sensor, which provides a plurality of elongated apertures through which the fluid flows. This unique coupling means provides substantial improvement in null stability over the prior art vortex rate sensors. In addition, the output signal of the sensor contains less noise.

Although the invention has been described and illustrated in detail, it is to be clearly understood that the same is by way of illustration and example only, and is not to be taken by way of limitation, the spirit and scope of this invention being limited only by the terms of the appended claims.

I claim as my invention:

1. A vortex rate sensor which is subject to an angular velocity about an axis of a body on which it is mounted comprising:
    a first element having a first passage therethrough;
    a second element having a second passage therethrough;
    coupling means, said coupling means including a plurality of annular discs, said discs being maintained in a spaced, parallel relationship by a plurality of spacer elements, said discs being maintained in a substantially coaxial relationship by a plurality of fasteners, said coupling means providing a plurality of annular elongated apertures, said coupling means positioned between said first and said second elements so as to form a cylindrical chamber, the axis of said first passage and the axis of said second passage being substantially coaxial with the axis of said coupling means, the sensor being adapted to be connected to a fluid source whereby a fluid flows from said fluid source through said annular apertures in said coupling means, and is viscously coupled to the angular velocity of said sensor through said coupling means, and said fluid exhausting through said first and said second passages; and
    readout means located in at least one of said passages operable to provide an output signal indicative of the angular velocity applied to said sensor.

2. A vortex rate sensor which is subject to an angular velocity about an axis of a body on which it is mounted comprising:
    a first element having a first plane surface thereon and having a passage therethrough, the axis of said passage being substantially perpendicular to said first plane surface;
    a second element having a second plane surface thereon;
    coupling means including a plurality of annular discs positioned in a spaced, substantially parallel by spacer means, and substantially aligned relationship so as to form a plurality of narrow elongated apertures, said coupling means positioned between said first plane surface and said second plane surface thereby forming a cylindrical chamber, the axis of said chamber being substantially perpendicular to said first plane surface and said second plane surface, the sensor being adapted to be connected to a fluid source whereby fluid flowing from said fluid source through said apertures in said coupling means is viscously coupled to the angular velocity of said vortex rate sensor and then flows, through said chamber and exhausts through said passage; and
    readout means located in said passage operable to produce a signal indicative of the rate applied to the sensor.

3. A vortex rate sensor which is subject to an angular velocity about an axis of a body on which it is mounted comprising:
    a first member having a passage therethrough;
    a second member;
    annular coupling means, spacer means located in said coupling means, said coupling means and said spacer means alternately spaced to thereby provide a plurality of elongated apertures angularly spaced about a first axis for viscously coupling the motion of said sensor to a fluid, said first member, said second member, and said coupling means cooperating to form a cylindrical chamber, the axis of said passage being parallel to said first axis, said passage being in communication with said chamber;

the sensor being adapted to be connected to a fluid source whereby said fluid flows from said fluid source through said apertures in said coupling means, through said chamber, and exhausts through said passage; and readout means located in said passage.

4. In a vortex rate sensor which is subject to an angular velocity about an axis of a body on which it is mounted: a vortex chamber of circular section; inlet means admitting fluid to said chamber at the periphery thereof; outlet means exhausting fluid from said chamber at the center thereof; coupling means mounted in said chamber so as to divide said chamber into an inner cylindrical portion in communication with said outlet means and an outer annular portion in communication with said inlet means, said coupling means comprising a plurality of annular discs severally perpendicular to the axis of said chamber and means mutually spacing said discs by predetermined small distances so as to provide a plurality of thin peripheral passages for fluid flow between the portions of said chamber, said predetermined distances being chosen to provide great viscous coupling between said fluid and said discs whereby rotary movement of said chamber imparts a vortical component to the flow of fluid in said outlet means; and means responsive to said vortical component.

References Cited by the Examiner

UNITED STATES PATENTS

| | | |
|---|---|---|
| 2,215,447 | 9/1940 | Kollsman. |
| 2,948,153 | 8/1960 | Stedman _____ 73—516 |
| 3,203,237 | 8/1965 | Ogren _____ 73—194 |

FOREIGN PATENTS

| | | |
|---|---|---|
| 1,318,907 | 1/1963 | France. |
| 332,133 | 1/1921 | Germany. |

RICHARD C. QUEISSER, *Primary Examiner.*

EDWARD D. GILHOOLY, *Assistant Examiner.*